United States Patent [19]

Jones et al.

[11] Patent Number: 4,923,769

[45] Date of Patent: May 8, 1990

[54] PRESSURE VESSEL CONSTRUCTION FOR A METAL OXIDE-HYDROGEN BATTERY

[75] Inventors: Kenneth R. Jones, Oconomowoc; John F. Sindorf, Pewaukee, both of Wis.

[73] Assignee: Globe-Union Inc., Milwaukee, Wis.

[21] Appl. No.: 334,362

[22] Filed: Apr. 7, 1989

[51] Int. Cl.$^5$ .............................................. H01M 2/06
[52] U.S. Cl. ..................................... 429/101; 429/181
[58] Field of Search .................. 429/27, 101, 12, 34, 429/181

[56] References Cited

U.S. PATENT DOCUMENTS

| | | | |
|---|---|---|---|
| 3,867,199 | 2/1975 | Dunlop et al. | 136/28 |
| 3,959,018 | 6/1976 | Dunlop et al. | 136/86 |
| 4,107,395 | 8/1978 | Van Ommering | 429/21 |
| 4,112,199 | 9/1978 | Dunlop | 429/29 |
| 4,115,630 | 9/1978 | Van Ommering | 429/72 |
| 4,324,845 | 4/1982 | Stockel | 429/101 |
| 4,585,711 | 4/1986 | Vaidyanathan | 429/42 |

OTHER PUBLICATIONS

SAE Technical Paper Series, "Design and Study of a 15 kWh Hydrogen/Nickel Oxide Battery for Photovoltaic Applications", Sindorf et al., 20th IECEC, Aug. 1985.

*Primary Examiner*—Donald L. Walton
*Attorney, Agent, or Firm*—Andrus, Sceales, Starke & Sawall

[57] ABSTRACT

A pressure vessel construction for a rechargeable metal oxide hydrogen battery. The pressure vessel includes a generally cylindrical shell, the ends of which are enclosed by dome shaped heads. A metal fitting is mounted within an opening in at least one head and the electrical leads connected to the battery cell are sealed within an opening in the fitting. The vessel includes a flexible inner liner of material which is impervious to the passage of hydrogen gas and an outer layer of fiber reinforced resin which is capable of withstanding the internal pressure generated by the hydrogen. The inner liner can consist of a plurality of wrappings of thin plastic film, such as polyvinylidene chloride, or alternately the inner liner can consist of thin metal sections having overlapping edge portions sealed by resilient elastomeric sealing strips which permit expansion and contraction of the metal liner under varying internal pressure conditions, without causing major tensile stress in the metal.

32 Claims, 2 Drawing Sheets

PRESSURE VESSEL CONSTRUCTION FOR A METAL OXIDE-HYDROGEN BATTERY

BACKGROUND OF THE INVENTION

Metal oxide hydrogen batteries, such as nickel oxide-hydrogen batteries, have seen wide use in aerospace applications because they are rechargeable, have an extremely long cycle life and provide a uniform output during the entire discharge cycle.

In the typical nickel oxide-hydrogen battery the positive electrodes are generally in the form of flat porous, sintered nickel plaques impregnated with nickel hydroxide, while the negative electrodes are formed of a fine nickel mesh screen having a catalyst, such as platinum black, bonded to one surface of the screen through a hydrophobic polymeric material. On discharge of the battery, hydrogen gas diffuses through the electrolyte surrounding the catalyst surfaces of the negative plates and becomes disassociated by the catalyst to the monoatomic form. The monoatomic hydrogen is ionized and combines with hydroxyl ions to form water with an electron being released in the process of forming each hydrogen ion. In addition, hydroxyl ions are formed at the positive electrode by the reaction of water with the available oxygen content of the nickel oxide. As a result of these reactions an electron current is produced in the exterior circuit.

On recharging the reaction is reversed, with the recharging being characterized by the regeneration of hydrogen gas at the negative electrode and the reoxidation of the nickel hydroxide at the positive electrode.

Due to the substantial gas pressures that are involved, the nickel oxide-hydrogen battery is contained within an outer pressure vessel. In the past the outer vessel has been composed of a nickel alloy, Inconel, due to the high strength and corrosion resistance of the Inconel alloy. However, Inconel is expensive and is difficult to fabricate into a closed cylindrical vessel. The practice has been to weld a thin Inconel sheath into a cylindrical shape and then weld dome shaped heads to the cylindrical shell.

The welding necessarily occurs after assembly of the battery cells and with the battery cells located within the vessel. The heat generated during the welding operation can adversely affect the performance of the battery and, therefore, steps have been taken in the past to isolate the welding heat from the cells through use of back up chills behind the weld joint and through use of laser beam welding which provides more concentrated or localized heating for the welding operation. Thus, the welding of the Inconel vessel requires a delicate and precisely controlled automated system which is extremely expensive and substantially increases the overall cost of the battery.

It has also been proposed to construct the pressure vessel for the battery of a welded, thin wall metal liner, which is in impervious to the passage of hydrogen gas, and a filament wound composite outer layer that is capable of withstanding the internal pressure. However, as the outer filament wound layer has different expansion characteristics than the thin metal liner, the internal pressure of the hydrogen gas may expand the metal liner beyond its yield, point and on release of the pressure, the metal liner may buckle.

SUMMARY OF THE INVENTION

The invention is directed to an improved outer pressure vessel for a metal oxide-hydrogen battery, such as a nickel oxide-hydrogen battery. The vessel includes a generally cylindrical section, the ends of which are enclosed by dome shaped heads. A metal fitting is mounted within an opening in at least one of the heads, and the electrical leads which are connected to the battery cell are sealed within an opening in the fitting and extend to the exterior.

In one form of the invention, the vessel includes an inner liner or membrane which is composed of overlapping layers of thin plastic film, such as polyvinylidene chloride. More specifically, the membrane includes a plurality of overlapping discs of plastic film which are secured to the inner surface of the fitting through a retaining ring and the outer peripheries of the overlapping discs extend radially from the fitting around the joint between the head and the cylindrical shell.

The inner liner also includes a plurality of circumferentially wound strips of plastic film which are interleaved with the discs, and a number of layers of helical windings of plastic film are then applied over the discs and the strips and extend the complete length of the vessel.

The layers of the thin plastic film are unbonded but the overlapping layers of the film are characterized by the ability to cling tightly together so that the layers of plastic film provide an expandable liner which is impervious to the passage of hydrogen gas.

The vessel also includes an outer layer of fiber reinforced thermosetting resin in which, the fibrous reinforcement is wound in a series of helical layers around the inner liner and provides the necessary hoop strength to resist the internal pressure within the vessel.

In a second form of the invention, the vessel includes an inner liner which is formed of a thin walled cylindrical metal section and a pair of thin walled metal heads. The cylindrical section is provided with a longitudinally extending interruption or joint and an elastomeric sealing strip is employed to seal the joint.

The open end of each head is disposed in lapping relation with an end of the cylindrical section, and elastomeric sealing strips are also employed to seal the joint between the heads and the cylindrical section.

As in the case of the first embodiment, substantially continuous fibrous material impregnated with a thermosetting resin is wrapped around the inner liner to provide an outer layer which is capable of withstanding the internal pressures.

The elastomeric sealing strips permit the inner metal liner to expand and contract in accordance with internal pressure variations and yet the sealing strips will maintain the impervious characteristics of the liner to prevent the passage of hydrogen gas through the liner.

The invention provides a sealed pressure vessel for a metal oxide hydrogen battery which is lighter in weight than metal vessels as used in the past and is inexpensive to construct.

Further, the vessel is not sensitive to manufacturing tolerances and avoids the metallurgical concerns, such as were involved in the laser beam welding procedures as used in the past.

Other objects and advantages will appear in the course of the following description.

The drawings illustrate the best mode presently contemplated of carrying out the invention.

DESCRIPTION OF THE ILLUSTRATED EMBODIMENT

Figure 1:
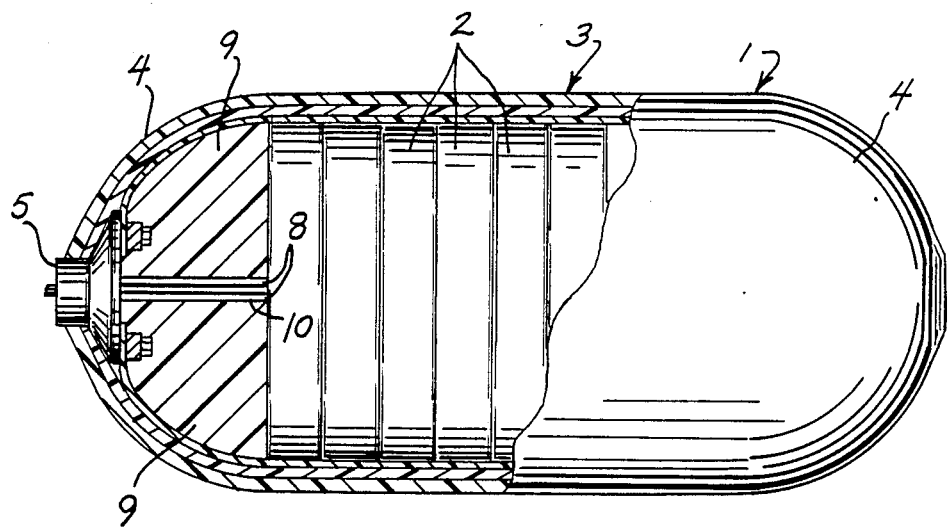
FIG. 1 is a side elevation of a metal-oxide hydrogen battery of the invention with parts broken away in section.
Figure 2:
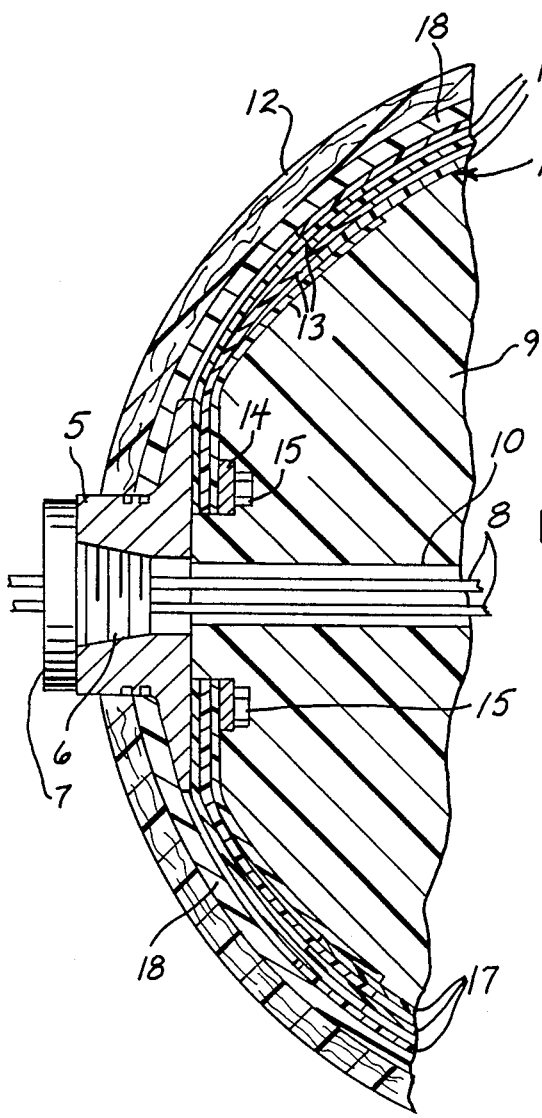
FIG. 2 is an enlarged fragmentary longitudinal section showing the attachment of the inner and outer layers to the fitting in the vessel head.
Figure 3:
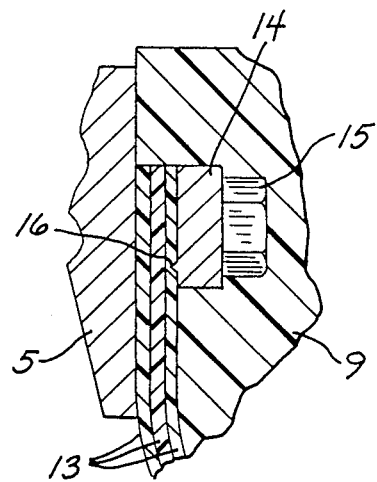
FIG. 3 is an enlarged longitudinal section showing the attachment of the plastic film discs to the fitting.
Figure 4:
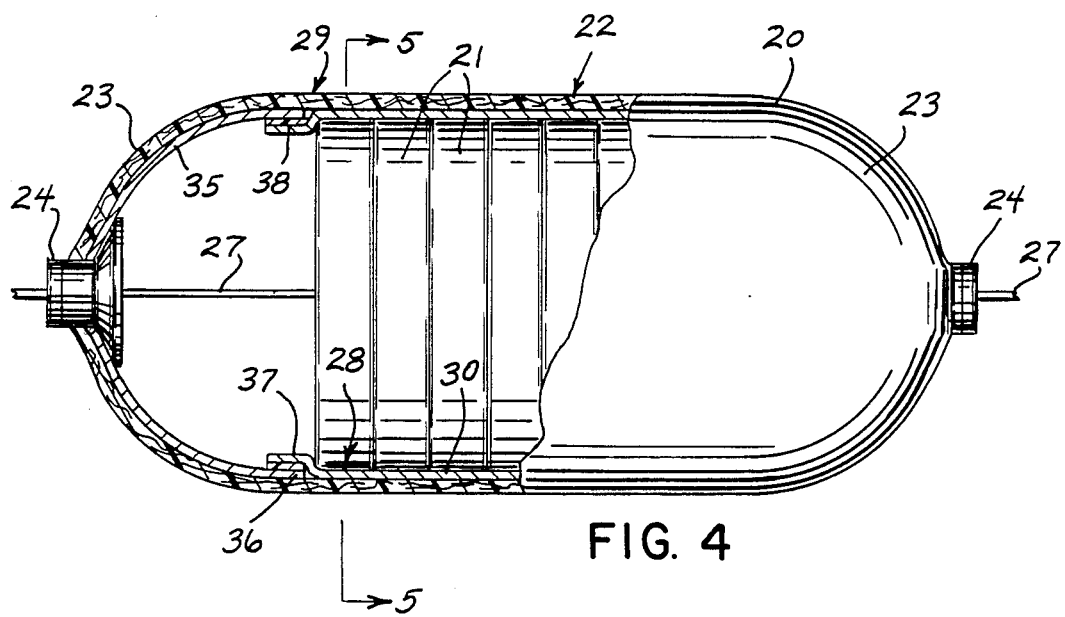
FIG. 4 is a side elevation with parts broken away showing a modified form of the invention.

FIGS. 1-3 illustrate a rechargeable metal oxide-hydrogen battery, such as a nickel oxide-hydrogen battery. The battery includes an outer pressure vessel 1 that houses a group of battery cell modules 2 that can be constructed as disclosed in the co-pending patent application Ser. No. 334,361, filed 4/7/89 and entitled Metal Oxide-Hydrogen Battery. As disclosed in the aforementioned patent application, the vessel 1 contains two semi-cylindrical stacks of the cell modules 2 with the modules in each stack being in side-by-side relation. In general, each module is composed of a pair of back-to-back positive electrodes spaced apart by a separator layer, along with a pair of negative electrodes, each disposed adjacent and separated from a positive electrode. The positive electrodes are in the form of flat, porous, sintered nickel plaques impregnated with nickel hydroxide, while the negative electrodes are in the form of a fine mesh nickel screen having a catalyst, such as platinum black, bonded to one surface of the screen through a hydrophobic polymeric material. An electrolyte, such as a potassium hydroxide solution, is impregnated into fibrous separator layers that separate the electrodes.

The modules can be connected together either in series or parallel relation to obtain the desired voltage output.

Vessel 1 includes a generally cylindrical shell 3 the ends of which are enclosed by generally dome shaped heads 4. A metal fitting 5, formed of an aluminum alloy or the like, is mounted within an opening in one of the heads 4 and fitting 5 is provided with an axial threaded opening 6 which receives a plug 7. Electrical leads 8 connected to the cell modules 2 extend through and are sealed within an opening in plug 7.

As shown in FIG. 1, both of the leads connected to the cell modules 2 extend through the plug 7 in fitting 5 at one end of vessel but it is contemplated that in other installations one of the leads, would extend through a fitting 5 at one end of the vessel while the second lead would extend outwardly through a fitting 5 in the opposite end of the vessel.

Located between the end of the stacked cell modules 2 and each fitting 5 is a generally dome shaped form 9. The forms 9 are composed of a self-supporting material which can take the form of open cell polymeric foam, such as polyurethane foam, or alternately the forms 9 can be composed of thin walled metal or plastic. The forms 9 act as supports to support the winding of resin impregnated fibrous material, which is employed as the outer layer of the vessel, as will be hereinafter described.

Each form 9 includes central passage 10 that communicates with the opening 6 in fitting 5 and the leads extend through the passage 10.

Vessel 1 is composed of a flexible inner liner or membrane 11 and an outer filament wound layer 12 which is capable of withstanding the internal pressures generated within the vessel 1.

Inner liner 11 is imprevious to the passage of hydrogen gas and consists of a plurality of layers or wrappings of a polymeric film, preferably polyvinylidene chloride.

More specifically, inner liner 11 includes a plurality of overlapping annular discs 13 of polymeric film which are mounted in sealed relation to the inner surface of fitting 5 through a retaining ring 14 which borders opening 6 in fitting 5. A series of bolts 15 secure ring 14 to the inner surface of fitting 5, and the inner surface of retaining ring 14 is provided with an annular rib or projection 16 having a sharpened edge which digs into the discs 13 as ring 14 is assembled to fitting 5 to prevent the displacement of the discs and aid in providing a seal between the discs and, the fitting 5.

As shown in FIG. 2, the outer extremities of overlapping discs 13 extend radially outward and around the joint between head 4 and shell 3, and a group of annular strips 17 of polymeric film are interleaved with the discs 13, as shown in FIG. 2. The strips 17 extend to either side of the joint between the head 4 and the shell 3.

For clarity, the drawings illustrate three discs 13 being interleaved or interdigitated with three strips 17. However, in practice, 8 or 10 discs 13 and strips 17 can be interleaved.

In addition, the inner liner 11 also includes a layer of helically wound strips of polymeric film 18. The strips 18 are wound in a helical or circumferential pattern and extend substantially the entire length of the vessel, covering the discs 13 and strips 17, as well as the overlapping joints there between.

The polymeric film is impervious to the passage of hydrogen gas, and the overlapping layers have the ability to cling tightly together to provide a completely sealed yet expandable liner for the vessel, without the need of a binding material or adhesive between the overlapping layers.

Outer layer 12 is a conventional filament wound structure and can take the form of fibrous material impregnated with a thermosetting resin. The fibrous material can be glass or graphite fibers, or a combination thereof, which are wound in a number of superimposed layers to provide the desired strength for the vessel to withstand the internal pressures. The winding pattern can be that conventionally used in the fabrication of filament wound vessels and can include a combination of helical as well as substantially longitudinal windings.

The thermosetting resin can be a type conventionally used in filament winding processes, such as a polyester or epoxy resin.

During the winding operation the filaments or strands are wound over the stacked cell modules 2, and the forms 9 provide a support for the windings in the area between the cell modules 2 and the fittings 5.

The inner liner of polymeric film is impervious to the passage of hydrogen gas and will expand and contract under variations in internal pressure. The outer layer 12 serves as a structural support and has adequate hoop strength to withstand the internal pressure.

FIGS. 4–7 illustrate a modified form of the invention which includes a pressure vessel 20 that houses two semi-cylindrical stacks of cell modules 21, similar to cell modules 2 of the first embodiment.

Figure 6:
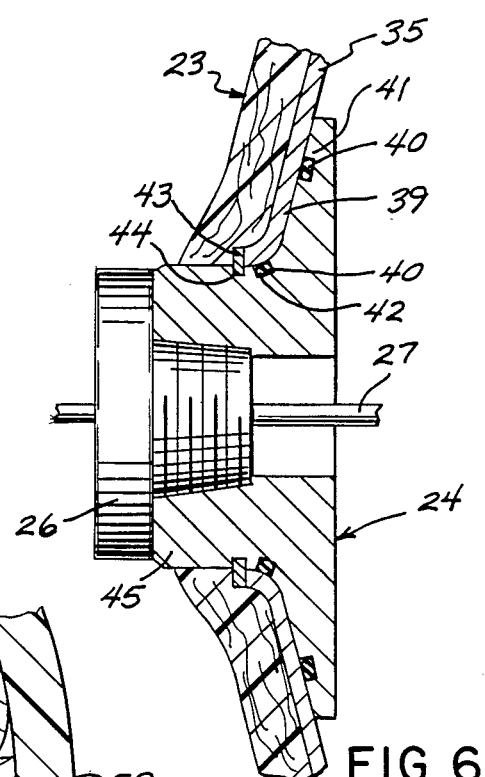
FIG. 6 is a fragmentary longitudinal section showing the attachment of the metal head section to the fitting.

Vessel 20 includes a cylindrical shell 22, the ends of which are enclosed by generally dome shaped heads 23. A metal fitting 24, similar to fitting 5, is mounted within an opening in both of the heads 23. As shown in FIG. 6, each fitting 24 is provided with a central threaded opening which receives a plug 26 and a lead 27 which is connected to the cell modules 21 is sealed within an opening in each plug 26.

Vessel 20 includes a thin metal liner 28 and an outer layer 29 formed of fiber reinforced resin and which is similar in structure to the outer layer 12, previously described.

Figure 5:
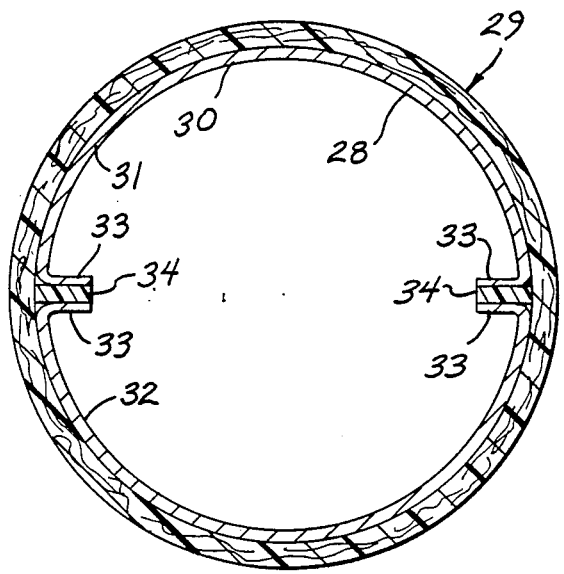
FIG. 5 is a transverse section taken along line 4—4 of FIG. 3.

Inner liner 28 is composed of a generally cylindrical section 30 that includes a pair of semicylindrical halves 31 and 32. The longitudinal side edges of each half are provided with inwardly extending flanges 33, and an elastomeric sealing strip 34 is located between the mating side flanges 33 to seal the joint there between, as seen in FIG. 5. Alternately, the mating flanges can extend radially outward, or the longitudinal side edges of the cylindrical section can be in overlapping relation. In either case, the elastomeric sealing strip is positioned between the overlapping flanges or side edges.

Inner liner 28 also includes a pair of generally dome shaped head sections 35 and the open end 36 of each head section 35 is disposed in lapping relation with an end 37 of cylindrical section 30. An elastomeric sealing strip 38 is disposed between the lapping edges 36 and 37 to seal the joint there between.

Each head section 35 is mounted in sealed relation to the respective fitting 24. As shown in FIG. 6, the head section 35 is sealed to the outer surface 39 of fitting 24 through a pair of O-rings 40 which are mounted within grooves 41 and 42 in fitting 24. To provide an effective seal between each head section 35 and fitting 24, the O-rings 40 are maintained in a compressed state. This is accomplished by forcing the head sections 35 axially against the surfaces 39 to compress the O-ring seals 40 and then inserting a snap ring 43 in groove 44 formed in neck 45 of the fitting. Engagement of the snap ring 43 with groove 44 will prevent the head section 35 from moving axially away from the fitting 24, and thus will maintain the O-rings 40 in a compressed condition, thereby effecting a positive seal.

The outer layer 29, which is formed of fiber reinforced thermosetting resin, is wound in a number of helical layers, as previously described, over the metal liner 28 to complete the assembly of the vessel.

The sections 30 and 35 of metal liner 28 are formed of a metal, such as stainless steel, which is impervious to the passage of hydrogen gas and generally have a thickness in the range of 0.020 to 0.125 inches.

Figure 7:
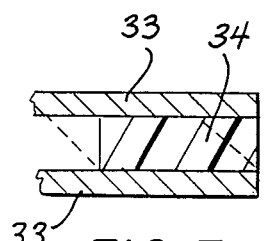
FIG. 7 is a sectional view showing in schematic form the attachment of the metal liners by use of an elastomeric strip.
Figure 8:
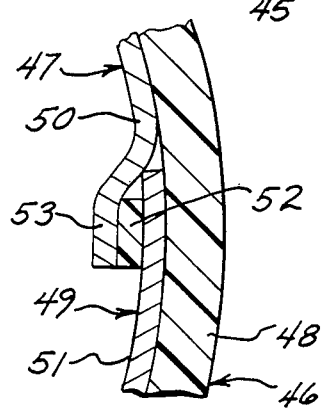
FIG. 8 is a fragmentary longitudinal section of a further modified form of the invention and showing the attachment of two metal shell sections.

FIG. 8 illustrates a further modified form of the invention, similar to that shown in FIGS. 4–7, but utilizing a different joint construction between the semi-cylindrical halves of the metal liner. More specifically, vessel 46 is composed of a thin metal liner 47 and an outer layer 48 formed of fiber reinforced thermosetting resin, and which is similar to outer layer 29, previously described.

Inner metal liner 47 includes a generally cylindrical section 49 enclosed by a pair of dome-like heads, not shown. The cylindrical section 49, in turn, is composed of a pair of semi-cylindrical halves 50 and 51 having overlapping longitudinal side edges that are joined by an elastomeric sealing strip 52, similar in structure and function to strip 34. As shown in FIG. 8, the side edges of half 50 are offset inwardly, as indicated by 53, to accommodate strip 51.

The sealing strips 34, 38, and 52 can be formed of a resin, such as a urethane or a modified epoxy, or alternately the strips can be formed of rubber bonded to the respective metal surfaces through an adhesive. In practice the sealing strips 34, 38, and 52 have a thickness of about 0.04 inch and a width of about one inch. The seals being elastomeric permit relative movement between the metal, liner sections during varying internal pressure conditions. When the interior of the vessel is pressurized, the sealing strips will be subjected to shear stress and the edges of the sealing strips, as illustrated in FIG. 7 can be deformed to an angle of about 45° with respect to their original position. Due to the resilient nature of the sealing strips, the strips will return to their original configuration as the internal pressure is relieved.

This resilient action of strips 34, 38 and 52 relieves the metal liner 30,35 of any major tensile forces that might otherwise allow the metal to stretch beyond its elastic limit. In this arrangement, all of the force of pressurization is carried by the outer element wound layer 12, 29, 48.

While the sealing strips 34,38,52 are not as impervious to the passage of hydrogen gas as the metal liner itself, the width of the strips, i.e., about 1 inch, provides a passage of substantial length which prevents the passage of hydrogen through the sealing member.

The pressure vessel of the invention is a light weight construction having an outer filament wound structural layer and an inner gas-impermeable expandable liner that will follow the expansion of the outer layer under increased internal pressure.

Further, the method of producing the vessel is not sensitive to manufacturing tolerances and eliminates metallurgical concerns as existed in prior methods of fabrication.

Various modes of carrying out the invention are contemplated as being within the scope of the following claims particularly pointing out and distinctly claiming the subject matter which is regarded as the invention.

We claim:

1. A metal oxide-hydrogen battery, comprising an outer vessel, a battery cell disposed within the vessel, said vessel including a flexible inner liner of a material impervious to the passage of hydrogen gas, and an outer layer of fiber reinforced resin disposed in contact with said inner liner, a fitting disposed within an opening in a wall of said vessel and having an opening therethrough, and sealing means for sealing said inner liner to said fitting.

2. The battery of claim 1, wherein said vessel includes a generally cylindrical section and a pair of generally dome shaped heads enclosing the ends of said cylindrical section, said fitting being mounted in an opening in one of said heads.

3. The battery of claim 1, wherein said resin is a thermosetting resin and said fiber reinforcement comprises substantially continuous filaments disposed in a generally helical pattern around said inner liner.

4. The battery of claim 1, including electrical connection means connected to said cell and extending through said fitting to the exterior of said vessel.

5. The battery of claim 1, wherein said inner liner is composed of polymeric film.

6. The battery of claim 5, wherein said polymeric film is polyvinylidene chloride.

7. The battery of claim 2, wherein said inner liner includes a plurality of annular discs of polymeric film secured in overlapping relation to an inner surface of said fitting, the peripheral edges of said overlapping discs being disposed radially outward of said fitting, said liner also including a plurality of strips of polymeric film interleaved with said discs and extending over the joint between said head and said shell.

8. The battery of claim 7, and including a plurality of generally helical windings of polymeric film disposed over said discs and said strips.

9. The battery of claim 8, wherein the overlapping portions of said discs, strips and windings are unbonded.

10. The battery of claim 9, wherein said polymeric film is polyvinylidene chloride.

11. The battery of claim 2, wherein said inner liner comprises a generally cylindrical thin metal section having at least one longitudinal discontinuity, first elastomeric sealing means sealing said discontinuity, a pair of thin metal dome shaped head sections each having an end disposed in lapping relation with an end of said cylindrical section, and second elastomeric sealing means disposed between said lapping ends to seal the joint there between.

12. The battery of claim 11, wherein said first and second sealing means have a thickness of about 0.04 inch and have a width of about 1 inch.

13. A metal oxide hydrogen battery, construction comprising an outer vessel, and a battery cell disposed within the vessel, said vessel including a generally cylindrical central section and a pair of heads enclosing the ends of said central section, a fitting disposed in at least one of said heads, said vessel including an inner liner of polymeric film characterized by being impervious to the passage of hydrogen gas, and an outer layer of fiber reinforced thermosetting resin capable of withstanding the pressure of the hydrogen gas contained within the vessel, and electrical conducting means extending in sealed relation through said fitting and electrically connected to said cell.

14. The battery construction of claim 13, and including a dome shaped member disposed within each head of said vessel and disposed in contact with the inner surface of the liner, said member having a passage for said electrical conducting means.

15. The vessel construction of claim 14, wherein said member is composed of foam resin.

16. The vessel construction of claim 15, wherein said resin is polyurethane.

17. The vessel construction of claim 13, wherein said inner liner comprises a plurality of overlapping annular discs of said film secured to the inner surface of said fitting bordering said electrical conducting means, the outer extremities of said discs projecting radially outward and extending beyond the joint between said head and said cylindrical section, a plurality of strips of said film interdigitated with said discs and extending across said joint, and a plurality of generally helical windings of said film extending substantially the length of said vessel and covering said discs and said strips.

18. The vessel construction of claim 17, wherein said discs and said strips and said windings are unbonded to each other.

19. The vessel construction of claim 18, wherein said film is composed of polyvinylidene chloride.

20. The vessel construction of claim 17, and including a retaining ring securing said discs to the inner surface of said fitting.

21. The vessel construction of claim 20, and including an annular projection disposed on said retaining ring and facing said fitting, said projection being imbedded within the overlapping discs to prevent displacement of said discs relative to said fitting.

22. A metal oxide hydrogen battery construction, comprising an outer vessel, and a battery cell disposed within the vessel, said vessel including a generally cylindrical central section and a pair of heads enclosing the ends of said central section, a fitting disposed in an opening in said vessel, said vessel including an inner liner characterized by being impervious to the passage of hydrogen gas and an outer layer of fiber reinforced thermosetting resin capable of withstanding the pressure of the hydrogen gas contained within the vessel, electrical conducting means extending in sealed relation through said fitting and electrically connected to said cell, said inner liner comprising a thin generally cylindrical metal section having at least one longitudinal discontinuity, elastomeric sealing means disposed in said discontinuity to seal the same, said inner liner also including a pair of thin metal head sections each having an end disposed in lapping relation with an end of said cylindrical section, and second elastomeric sealing means disposed between said lapping ends to seal the joint there between.

23. The vessel construction of claim 22, wherein said cylindrical section has a pair of overlapping side edges bordering said discontinuity, said first sealing means disposed between said side edges.

24. The vessel construction of claim 23, wherein said overlapping side edges comprise flanges that extend radially outward.

25. The vessel construction of claim 23, wherein said overlapping side edges comprise flanges that extend radially inward.

26. The vessel construction of claim 22, wherein said opening is in a head, said construction also including third sealing means for sealing said head section to said fitting.

27. The vessel construction of claim 26, wherein said fitting includes an axially facing outer surface, said third sealing means being arranged to seal said head section to said surface.

28. The vessel construction of claim 27, wherein said third sealing means comprises a compressible O-ring.

29. The vessel construction of claim 28, and including means for urging the head section against said O-ring to compress said O-ring.

30. A metal oxide hydrogen battery construction, comprising an outer vessel, and a battery cell disposed within the vessel, said vessel including a generally cylindrical central section and a pair of heads enclosing the ends of said central section, a fitting disposed in at least one of said heads, said vessel including an inner liner characterized by being impervious to the passage of hydrogen gas, and an outer layer of fiber reinforced thermosetting resin capable of withstanding the pressure of the hydrogen gas contained within the vessel, electrical conducting means extending in sealed relation through said fitting and electrically connected to said cell, said inner liner comprising at least two thin metal sections having overlapping edge portions, and an elastomeric sealing strip disposed between said edge portions, said sealing strip being constructed and arranged such that internal pressure within said vessel will impart a shear stress to said sealing strip.

31. The vessel construction of claim 30, wherein said sealing strip is constructed and arranged with a thickness and length ratio sufficient to permit the ends of said strip to deform to an anglel of about 45° with respect to their original orientation under said sheer stress.

32. The vessel construction of claim 31, wherein said sealing strip has a width of about 1 inch and a thickness of about 0.04 inches.

* * * * *